United States Patent

Seelander

[15] 3,653,843
[45] Apr. 4, 1972

[54] FLUIDIZED BED APPARATUS

[72] Inventor: John Marshall Seelander, Downers Grove, Ill.

[73] Assignee: Copeland Systems Incorporated

[22] Filed: Sept. 29, 1970

[21] Appl. No.: 76,565

[52] U.S. Cl. .............................................. 23/284, 34/57 A
[51] Int. Cl. ............................................................. B01j 2/16
[58] Field of Search ........................... 34/57 A, 238, 237, 10; 263/21 A; 23/284, 288.3 S

[56] References Cited

UNITED STATES PATENTS

| | | | |
|---|---|---|---|
| 2,595,384 | 5/1952 | Johnsen et al. | 34/237 X |
| 2,614,034 | 10/1952 | Brummerstedt | 23/288 S |
| 2,666,528 | 1/1954 | Frandsen | 34/237 X |
| 2,690,962 | 10/1954 | Clarke | 23/288 S |
| 2,836,902 | 6/1958 | North | 34/57 A |
| 3,462,246 | 8/1969 | Copeland | 23/284 |

Primary Examiner—Frederick L. Matteson
Assistant Examiner—Robert A. Dua
Attorney—Hofgren, Wegner, Allen, Stellman & McCord

[57] ABSTRACT

A fluidized bed apparatus comprising a particle bed supported in a container on an orifice plate and subjected to varying temperatures causing thermal expansion and contraction of the plate in combination with an elongated transversely yieldable tube attached to the plate at its periphery and at areas spaced from the plate to the container so that expansion and contraction of the plate due to the varying temperatures results in transverse yielding of the tube without substantial permanent distortion of the plate itself.

8 Claims, 5 Drawing Figures

Patented April 4, 1972

INVENTOR
JOHN MARSHALL SEELANDER
BY Hofgren, Wegner, Allen, Stellman & McCord
ATTORNEYS

3,653,843

FLUIDIZED BED APPARATUS

BACKGROUND OF THE INVENTION

Fluidized bed apparatus utilizing solid particles are well known. These comprise a container with a transverse orifice plate supporting a particle bed and defining a plenum chamber or wind box beneath the plate into which gas such as air is conducted under pressure for flow up through the orifice plate and through the particles. This gas flow causes a fluid or flowing movement of the particles relative to each other and to the plate to expose their considerable surfaces. Thus, in one type of apparatus the gas contains oxygen and oxidizes and oxidizable material fed into the container for flow onto the particle surfaces where there is large area contact of the material with the oxygen.

It is customary in such apparatus for the gas to be preheated to a reaction temperature which may be as high as 1500°F. or more and then once the reaction is initiated the gas then supplied may be at ambient temperature or slightly above.

During this preheat the orifice plate is of course subjected to this high temperature while once the reaction has been initiated and becomes autogenous the orifice plate is cooled to a temperature usually varying between ambient and about 250°F. This is ordinarily the temperature of the air then being supplied to the plenum chamber.

In fluid bed reactors of the customary type these temperature changes cause permanent warping of the orifice plate in a relatively short time because ordinarily the plates are mounted at their peripheries so as to be relatively unyielding in the plane of the plate. This invention corrects this condition.

FIELD OF THE INVENTION

One of the features of the invention is to provide an improved fluid solid particle bed apparatus comprising a transverse orifice plate for supporting the particle bed and defining a plenum chamber on the side of the plate opposite the bed, the bed and plate while in use being subject to varying temperatures causing thermal expansion and contraction of the plate and means for mounting the plate in the container comprising an elongated transversely yieldable tube around and attached to the plate at its periphery so that expansion and contraction of the plate results in transverse yielding of the tube without substantial permanent distortion of the plate.

DESCRIPTION OF THE PREFERRED EMBODIMENTS

Figure 1:
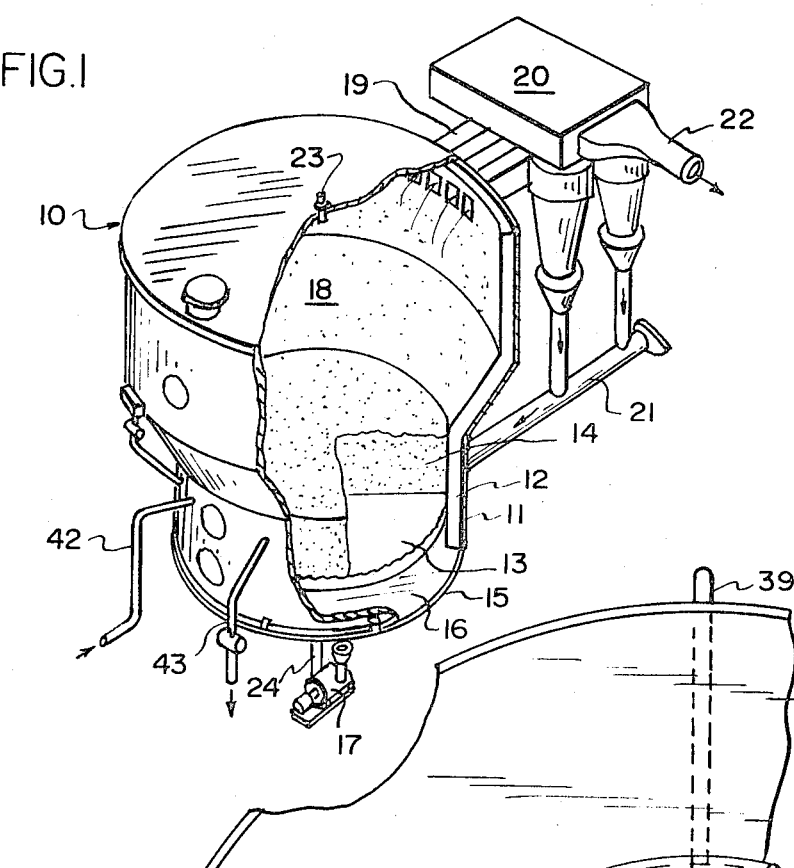
FIG. 1 is a perspective view of a fluid bed reactor including a container and an orifice plate supporting a particle bed.

The fluid bed reactor illustrated in FIG. 1 comprises a container 10 having sides 11 lined with a heat resistant insulating refractory material 12.

Located within the container 10 adjacent the bottom thereof is a transverse orifice or constriction plate 13 on which is supported a bed 14 of small particles which themselves may be a reactant or may be inert such as sand. As is customary, the plate 13 is provided with a plurality of orifice tubes 45 to prevent transfer of the particles from the bed 14 to the wind box 16.

The plate 13 is spaced above the bottom 15 of the container 10 to define a wind box or plenum chamber 16. This chamber is supplied with gas such as air under pressure by an air pump 17 which may also include means for preheating the air. Fresh particles for the bed 14 are supplied through a pipe 42 and solid reaction product is removed through the pipe 43.

The freeboard space 18 above the bed 14 is connected by conduits 19 to a dust separator 20 where entrained particles carried through the freeboard space 18 by the upward flowing air are separated and returned to the bed 14 through a conveyor 21 while the air and the gasses mixed therewith are vented through a pipe 22.

Where the bed 14 is fed with an oxidizable material as through a feed line 23 for contact with the air flowing up through the bed it is necessary to supply preheated air by way of the pump 17 and air line 24 in order to initiate the oxidation reaction in the bed 14 at a sufficiently high temperature that the reaction rapidly becomes autogenous at which time the preheating is stopped and the air supplied at a ambient temperature and temperatures slightly thereabove.

In typical preheat conditions the preheat temperatures may up to about 1,500°F. or higher and once the reaction has become autogenous the air temperature will then be reduced to ambient such as about 70°F. or higher and may be as high as 250°F. but still considerably below the preheat temperature.

Under these extreme temperature condition changes the orifice plate 13 is of course subjected to expansion and contraction which frequently either breaks the necessary gas tight seal between the plenum chamber 16 and the bed 14 zone at the edge of the orifice plate or causes permanent warping, wrinkling or corrugating of the plate 13 with subsequent rupture of the metal plate or the welding that normally joins the plate to its surrounding structure.

This problem is successfully solved by the invention described and claimed herein. In this invention the apparatus includes an improved means for mounting the orifice plate comprising an elongated transversely yieldable tube around and attached to the plate at its periphery and attaching means for mounting the tube within the container and engaging the tube at areas spaced from the plate so that expansion and contraction of the plate results in transverse yielding of the tube without substantial permanent distortion of the plate itself.

Figure 2:
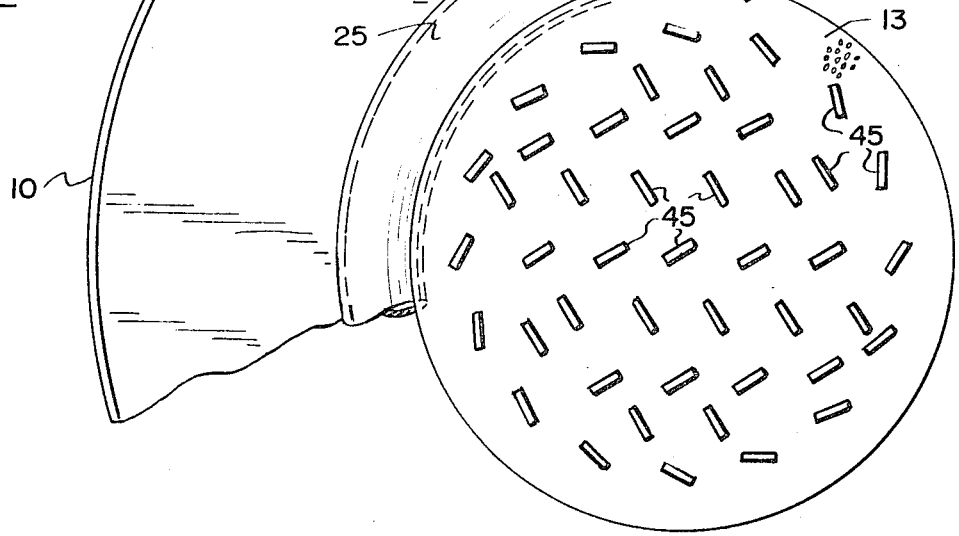
FIG. 2 is a fragmentary horizontal sectional view through a reactor of the type shown in FIG. 1 taken immediately above the orifice plate but omitting the particle bed.
Figure 3:
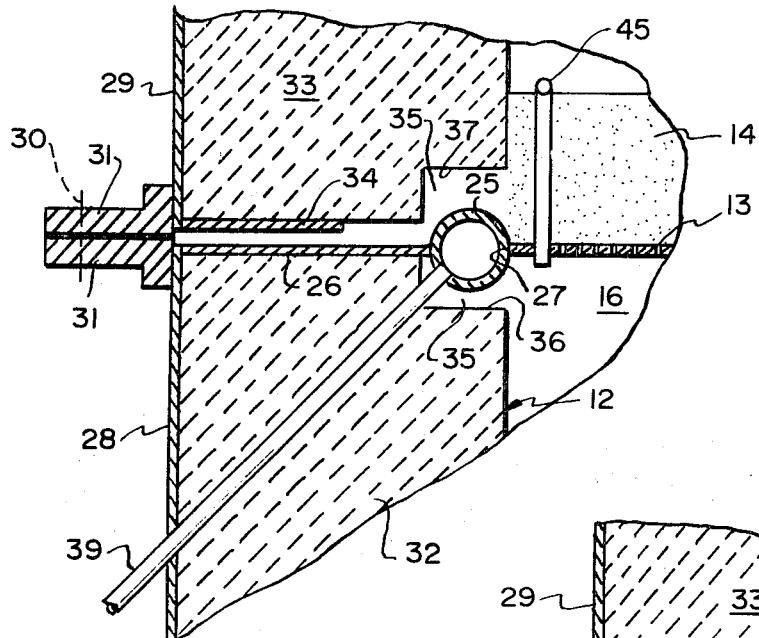
FIGS. 3, 4 and 5 are fragmentary vertical sectional views each illustrating a different embodiment of the invention.

As shown in the embodiment of FIGS. 2 and 3 the periphery of the orifice plate 13 is attached to the inner side of an elongated tube 25 which as shown here extends in a full circle around the circular periphery of the plate 13. The plate 13 is substantially coplanar with an annular plate 26 attaching means whose inner edge is attached to the tube 25 directly opposite the outer edge 27 of the orifice plate 13 and whose outer edge is attached to the lower section 28 or may be directly attached to the wall of the container 10. The plates 13 and 26 are also coplanar with the horizontal diameter of tube 25. The container 10 also includes an upper section 29 and the two sections are fastened together by fastening means indicated at 30 interconnecting overlapped pairs of external flanges 31 on the container sections 28 and 29.

Figure 4:
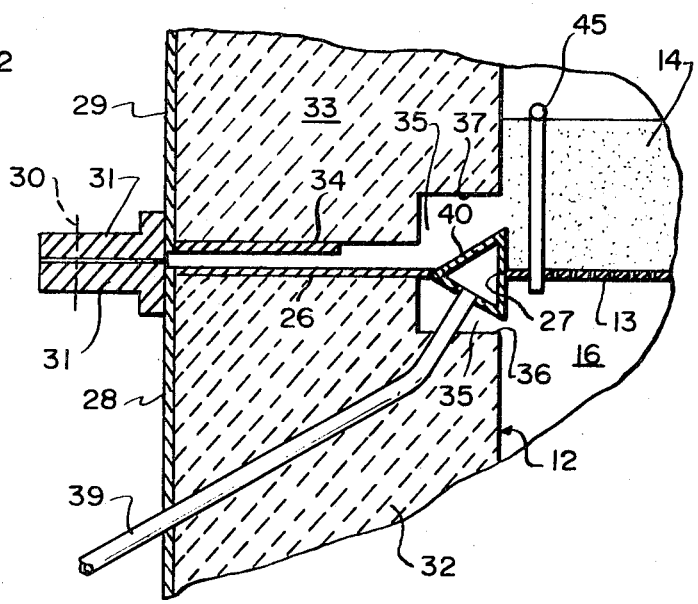
Figure 5:
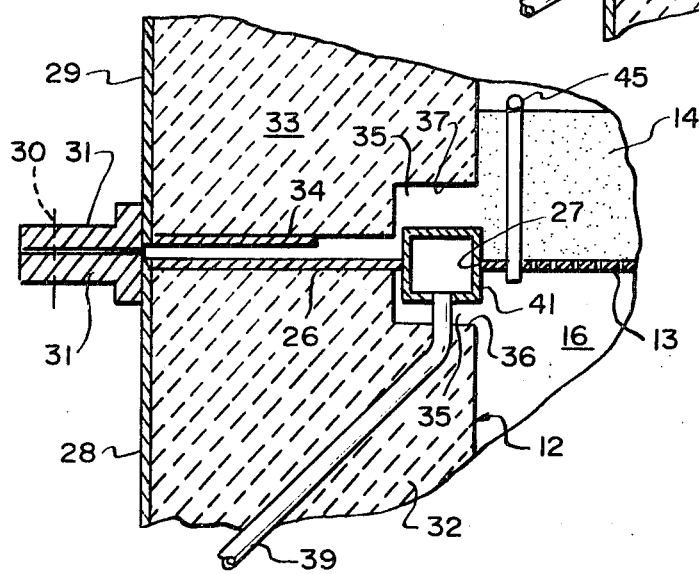

The container 10 is lined with the insulating material 12 divided into a bottom part 32 and a top part 33 spaced apart as shown in FIGS. 3–5 to provide room for the annular supporting plate 26. The upper insulation 33 is itself supported on an inwardly extending annular flange 34.

As shown in FIG. 2, the circular supporting tube 25 is received within a chamber 35 that is formed by cooperating corner cutout sections 36 and 37 in the adjacent inner corners of the insulating material 32 and 33, respectively.

Thus with this construction the hollow supporting tube 25 is protected by insulating material on the top, bottom and outer areas and is exposed to the heat of the preheated gas applied to the bed 14. Once the preheating has stopped as discussed above and the reaction becomes autogenous the support tube 25 will be relatively cool as as it will be at substantially the temperature of the incoming air in the wind box or plenum chamber 16.

In order to cool the tube 25 during preheating there is provided a conduit 39 extending through the lower section 28 of the container shell and up through the bottom insulating material 33 into communication with the tube 25. This conduit 39 is representative of the means for circulating a cooling fluid into and through the tube for cooling. The cooling fluid which may be either gaseous or liquid and may be specifically either air or water is used to prevent the metal of the supporting tube 25 or expansion chamber from reaching the preheat temperature. In addition, the internal pressure within the tube 25 supplied by way of conduits as exemplified at 39 may be varied so as to strengthen the supporting tube 25 against distortion as desired.

In the embodiment of FIG. 3 the tube 25 is of circular cross section. In the embodiment of FIG. 4 the supporting or expansion tube 40 is triangular. In the embodiment of FIG. 5 the tube 41 is of square or rectangular cross section. In all illustrated embodiments the tube is symmetrical in relation to the plate 13. As indicated by these various embodiments, the tube may be of any cross sectional shape desired so long as it fulfills the requirements of yieldably supporting the orifice plate 13.

The improved orifice or constriction plate structure of this invention successfully solves a major problem that is present in fluid particle bed apparatus particularly fluid bed reactor devices where the bed is first subjected to a high preheat temperature and then portions of the bed at the orifice plate are subjected to a much lower temperature when the reaction becomes autogenous. Becasue of these changes in temperature extremes the orifice plate which for proper operation of the reactor should be essentially flat tends to become permanently distorted so that it must be replaced. With the apparatus of this invention these difficulties are largely avoided as the supporting structure for the orifice plate not only is yieldable with the expansion and contraction of the plate but also provides a support for the plate of varying strength depending upon the internal pressure within the supporting tube.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. A fluidized bed apparatus, comprising: a container; a transverse orifice plate in said container for supporting a particle bed and defining a plenum chamber on the side of said plate opposite the bed, the plate having a periphery within said container, means for supplying pressurized fluid to said plenum chamber for flow through said plate and through said bed thereby causing flowing movement of the particles relative to each other and to the plate, the bed and plate while in use being subjected to varying temperatures causing thermal expansion and contraction of the plate; means for mounting said plate comprising an elongated transversely yieldable tube around and attached to said plate at its said periphery; and attaching means for mounting said tube within said container engaging the tube at areas thereof spaced from the plate, expansion and contraction of the plate thereby resulting in transverse yielding of said tube without substantial permanent distortion of the plate.

2. The apparatus of claim 1 wherein said plate and said attaching means are substantially symmetrically arranged on opposite sides of the tube.

3. The apparatus of claim 2 wherein said tube is of polygonal cross section.

4. The apparatus of claim 2 wherein said tube is of circular cross section.

5. The apparatus of claim 1 wherein said attaching means comprises an annular plate substantially coplanar with said orifice plate and having an outer edge attached to said container and an inner edge attached to said tube.

6. The apparatus of claim 1 wherein said container includes a heat resistant insulating liner and means are provided in said liner defining a chamber receiving said tube.

7. The apparatus of claim 1 wherein there is provided a conduit extending from exteriorly of the container and communicating with the interior of said tube for providing fluid under pressure to the interior of said tube.

8. The apparatus of claim 1 wherein said plate and said attaching means are substantially symmetrically arranged on opposite sides of the tube, and said attaching means comprises an annular plate substantially coplanar with said orifice plate and having an outer edge attached to said container and an inner edge attached to said tube.

* * * * *